United States Patent [19]
Humphreys et al.

[11] Patent Number: 5,348,340
[45] Date of Patent: Sep. 20, 1994

[54] AIR BAG ASSEMBLY FOR MOTOR VEHICLES

[75] Inventors: Gerard J. Humphreys, Boonton Township, Morris County, N.J.; Allen K. Breed, South Padre Island, Tex.; Torbjorn Thuen, Lakeland, Fla.

[73] Assignee: Breed Automotive Technology, Inc., Lakeland, Fla.

[21] Appl. No.: 8,689

[22] Filed: Jan. 25, 1993

Related U.S. Application Data

[63] Continuation-in-part of Ser. No. 715,493, Jun. 14, 1991, Pat. No. 5,197,757.

[51] Int. Cl.$^5$ ............................................. B60R 21/16
[52] U.S. Cl. ........................... 280/728 A; 280/728 B; 280/731; 280/734
[58] Field of Search ............... 280/728 A, 728 B, 731, 280/734; 180/282; 220/261, 266

[56] References Cited

U.S. PATENT DOCUMENTS

| | | | |
|---|---|---|---|
| 4,167,276 | 9/1979 | Bell et al. | 280/731 |
| 4,960,292 | 10/1990 | Sadler | 280/731 |
| 5,039,125 | 8/1991 | Buma et al. | 280/731 |
| 5,197,757 | 3/1993 | Breed et al. | 180/282 |

*Primary Examiner*—Eric Culbreth
*Attorney, Agent, or Firm*—Kane, Dalsimer, Sullivan, Kurucz, Levy, Eisele & Richard

[57] ABSTRACT

An air bag system designed for mounting on a steering wheel or other member of a motor vehicle passenger compartment includes an air bag assembly, an open housing for the same and a cover. The air bag assembly while separated from its housing is disarmed to prevent accidental deployment. The air bag is armed during its installation in the housing. The housing and assembly are constructed so that the cover cannot be installed if the air bag assembly is missing or it has been installed improperly so that it is not armed. When the air bag assembly is removed from the housing, it is automatically disarmed.

26 Claims, 6 Drawing Sheets

AIR BAG ASSEMBLY FOR MOTOR VEHICLES

RELATED APPLICATIONS

This application is a continuation-in-part of application Ser. No. 715,493, filed Jun. 14, 1991, entitled AN IMPROVED MECHANICAL CRASH SENSOR now U.S. Pat. No. 5,197,757.

BACKGROUND OF THE INVENTION a. Field of Invention

The present invention pertains to an improved air bag assembly for motor vehicles particularly suited for installation in a small space, such as the steering wheel, and more particularly, to an air bag assembly with coupling means to insure that the assembly is installed in a motor vehicle safely and correctly.

b. Description of the Prior Art

Typically an air bag assembly for a motor vehicle consists of a mechanical or electrical sensor, a gas generator connected to the sensor and a bag arranged for inflation from gasses from said generator. In operation, when the sensor detects that the motor vehicle is subjected to a deceleration of a preset magnitude and duration, it sets off the gas generator which in turn inflates the bag. During the installation or removal of the assembly, the sensor should be disarmed to insure that the gas generator is not activated accidentally, for example if the assembly is dropped, or jarred. This problem is especially important for assemblies with mechanical sensors. However, once the assembly is installed the sensor should be armed; otherwise the air bag assembly is non-functional and therefore useless. However, prior art assemblies had no installation or disassembly provisions which operated satisfactorily.

OBJECTIVES AND SUMMARY OF THE INVENTION

Therefore it is an objective of the present invention to provide an assembly in which the sensor is automatically disarmed when not installed onto the vehicle, and is armed when the installation of the gas generator is completed.

A further objective is to provide an assembly with means of assuring that the installation of the system cannot be completed if the sensor is disabled.

A further objective is to provide an assembly which can be installed easily and without the use of special tools.

Other objectives and advantages of the invention shall become apparent from the following description.

The present invention pertains to a self-contained air bag system disposed in a well formed in the steering wheel. The system includes a cover for the well, an inflatable air bag disposed in the cover, a gas generator disposed in the well and various hardware for mounting the above mentioned elements on the steering wheel. These various elements cooperate to insure that the gas generator is armed and the cover is installed only if the gas generator is properly installed in the well. Removal of the gas generator automatically disarms it.

DETAILED DESCRIPTION OF THE INVENTION

Figure 1:
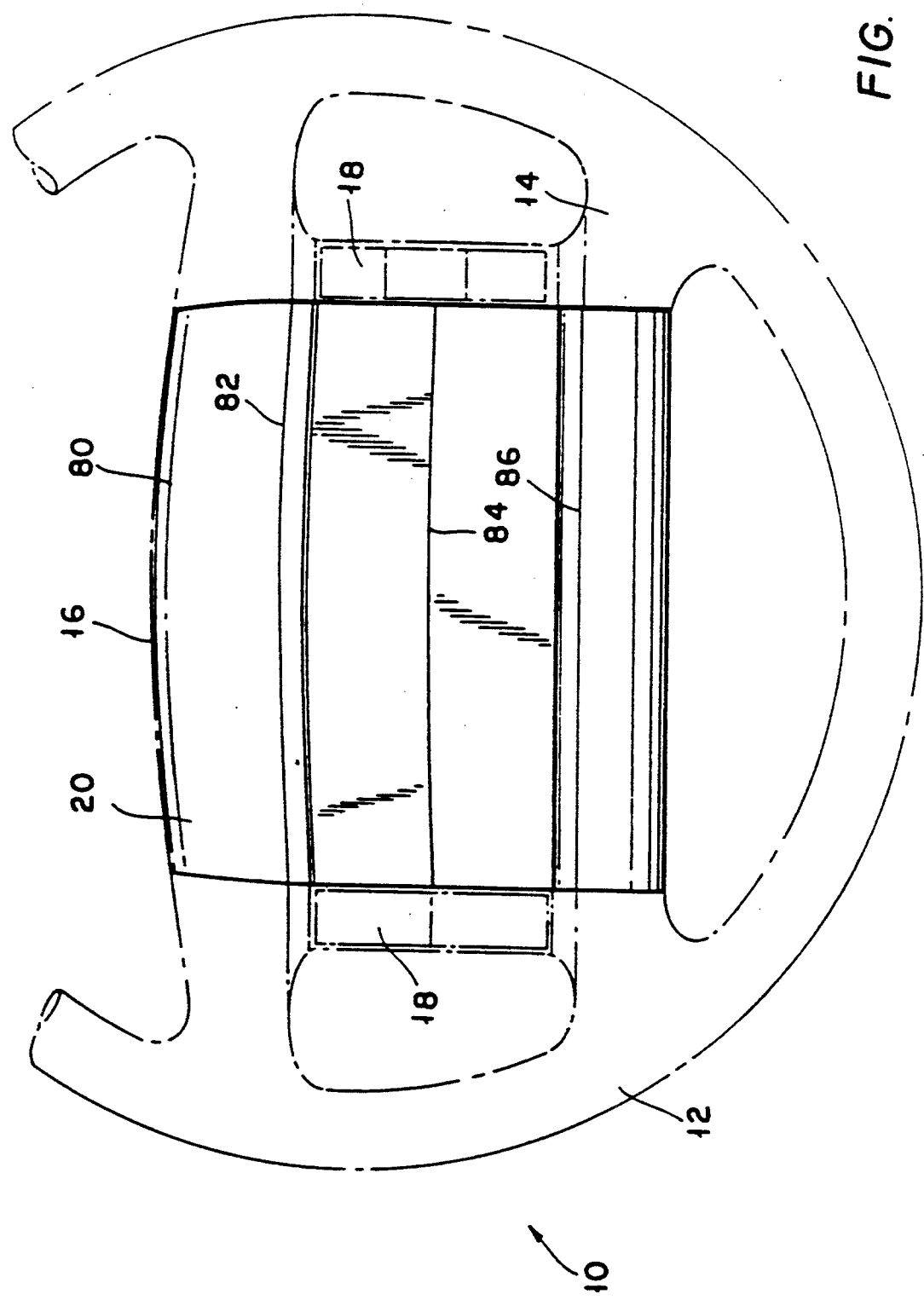
FIG. 1 shows a plan view of a steering wheel with an air bag assembly constructed in accordance with this invention.

Referring now to the Figures, FIG. 1 shows a top view of an assembled steering wheel 10 having a rim 12 joined by several spokes 14 to a central hub 16. Although the shape of the hub 16 is immaterial for the present invention, in the embodiment of FIG. 1, the hub 16 is generally rectangular. Disposed on two lateral sides of the hub there are a plurality of switches 18 associated with the operation of the motor or its accessories. Also mounted on hub 16 is a cover 20. The cover 20 is secured to the wheel 10 as described below.

Figure 2:
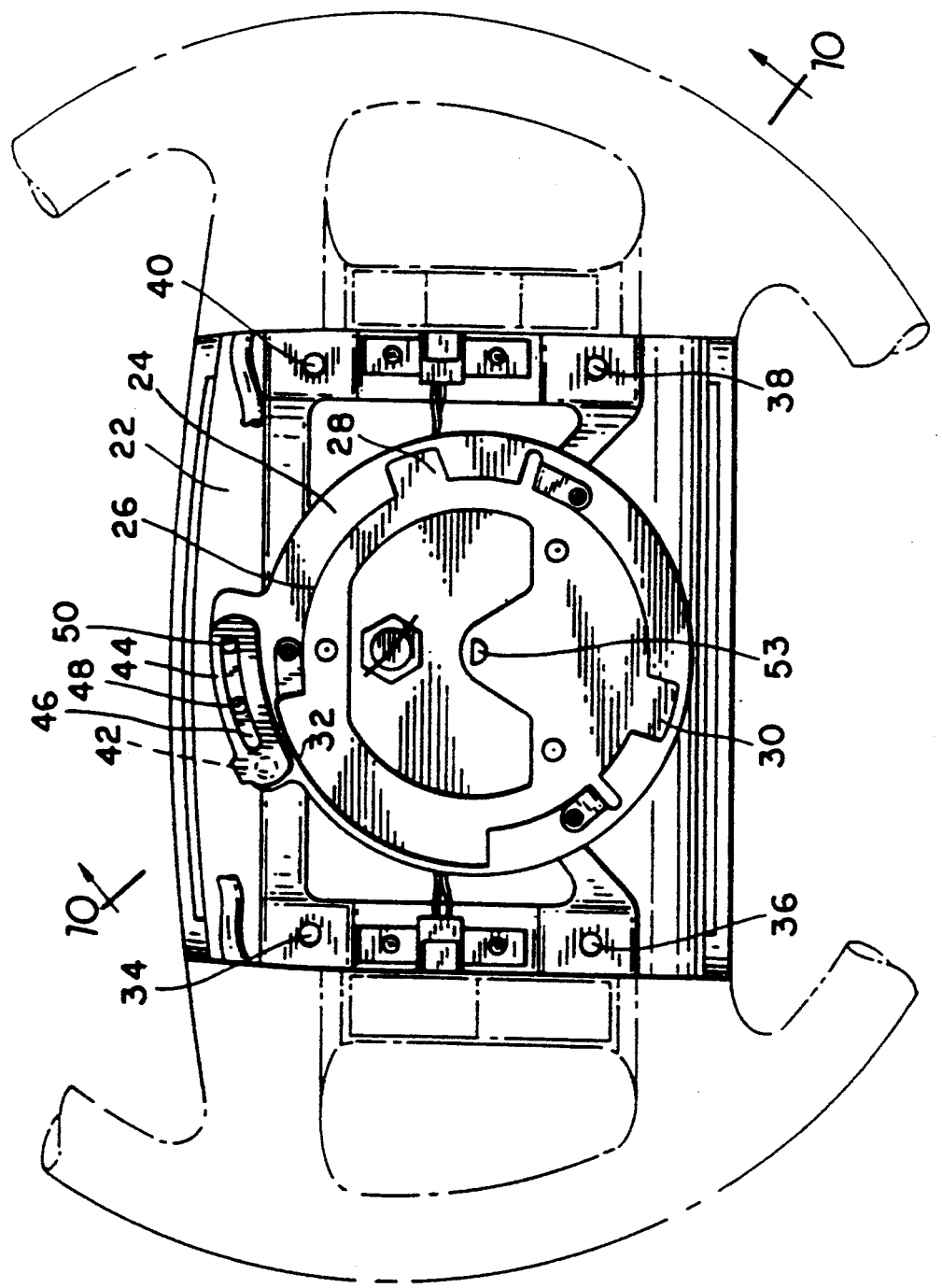
FIG. 2 shows a plan view similar to FIG. 1 showing a well within the steering wheel for housing the assembly.
Figure 10:
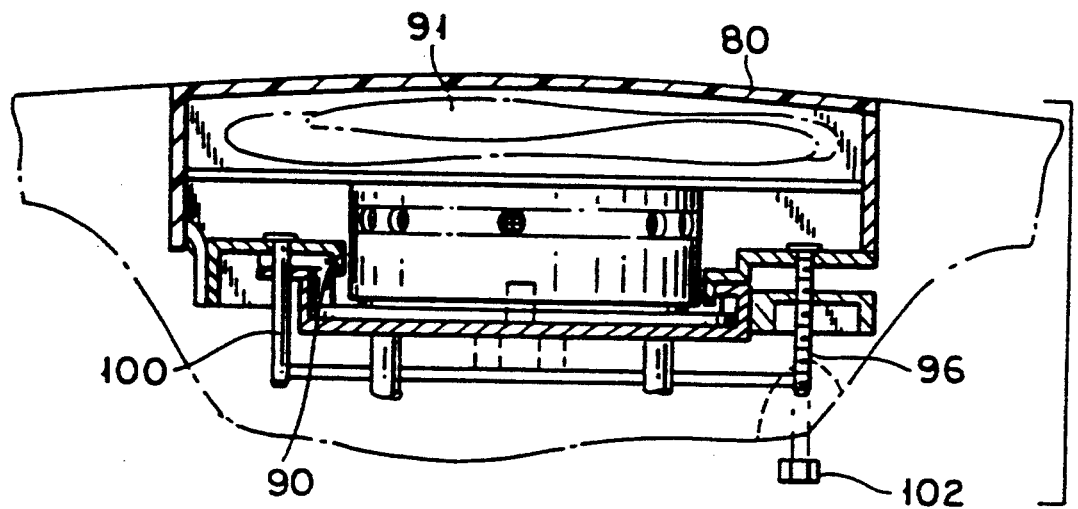
FIG. 10 shows a side sectional view of the air bag assembly installed in the steering wheel.
Figure 11:
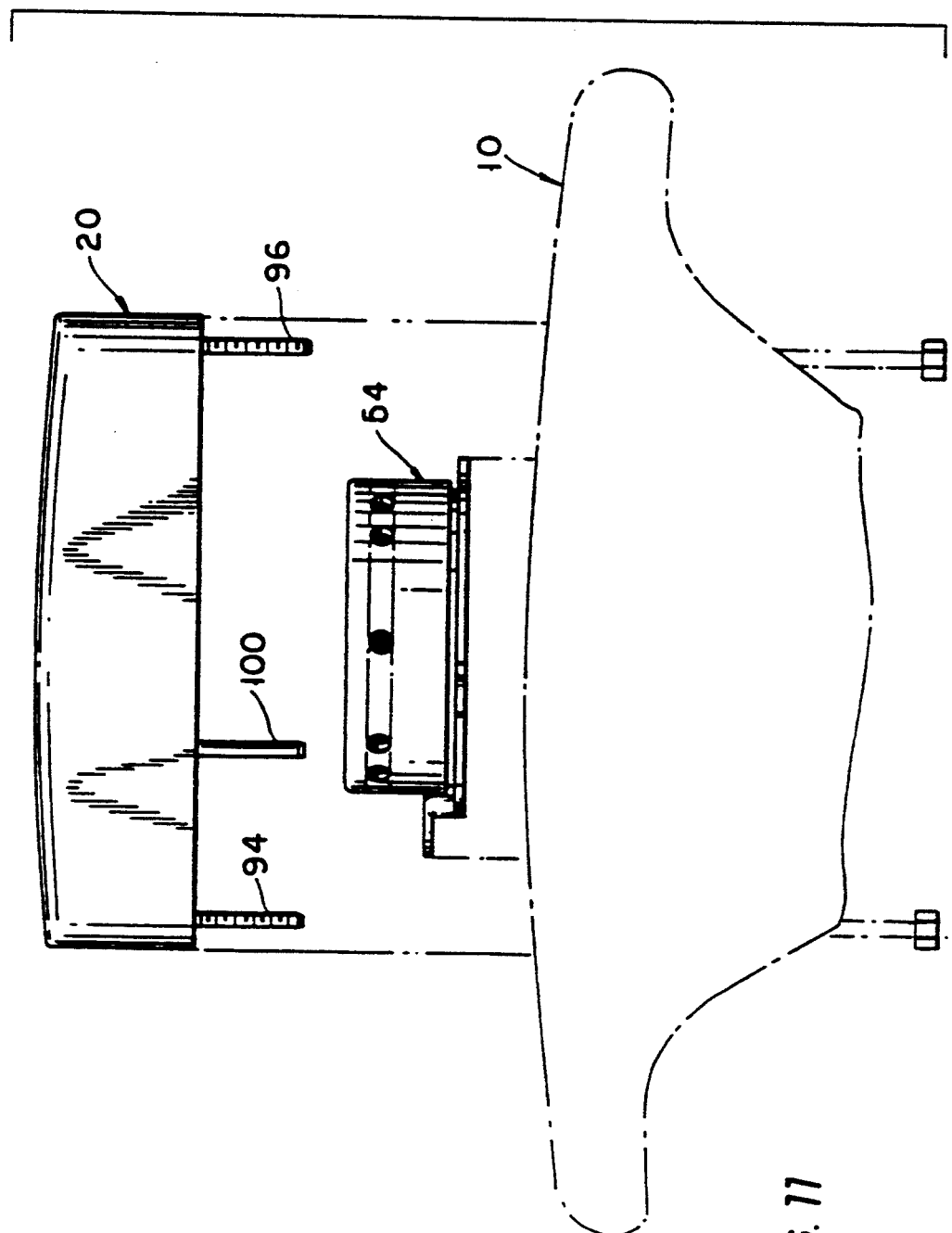
FIG. 11 shows an exploded side view of the assembly.

FIG. 2 shows the steering wheel 10 with the cover 20 and other air bag elements removed. As seen in FIGS. 2 and 10, steering wheel 10 is formed with a well 22 holding a metal backing plate 24. Backing plate 24 defines a circular opening with a lip 26 which is interrupted by three arcuate notches 28, 30, 32. Notches 28 and 30 extend over an arc of circular much smaller than notch 32.

The well 22 is also provided five through holes for mounting the cover 20. Four of these holes 34, 36, 38 and 40 are always exposed while the fifth hole 42 is covered by a sliding plate 44. Sliding plate 44 is slidably mounted on backing plate 24 and has an arcuate slot 46 engaged by two guiding pins 48, 50. A spring (not shown) disposed below the sliding plate 44 is used to bias this sliding plate 44 to the position shown in FIG. 2 wherein the sliding plate 44 covers hole 42.

A shaft 53 extends upwardly from the bottom of well 22. As seen in FIG. 2, shaft 53 has a D-shaped cross-section.

Figure 4:
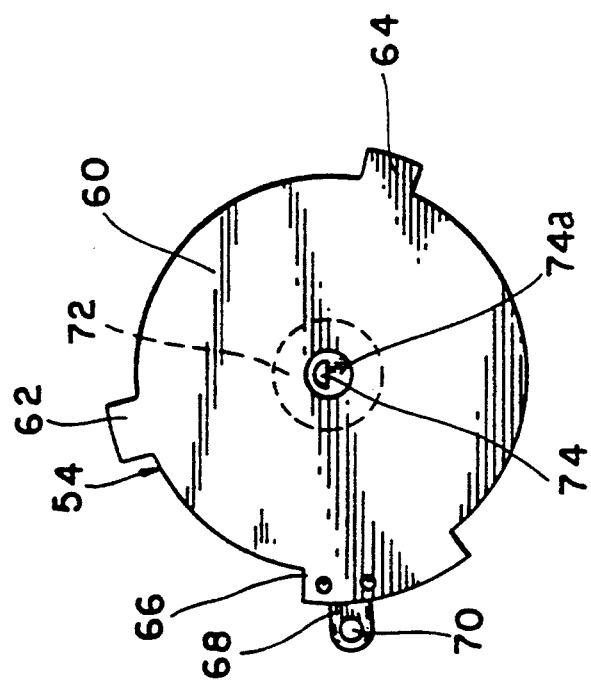
FIG. 4 shows a bottom view of the gas generator of FIG. 3.
Figure 5:
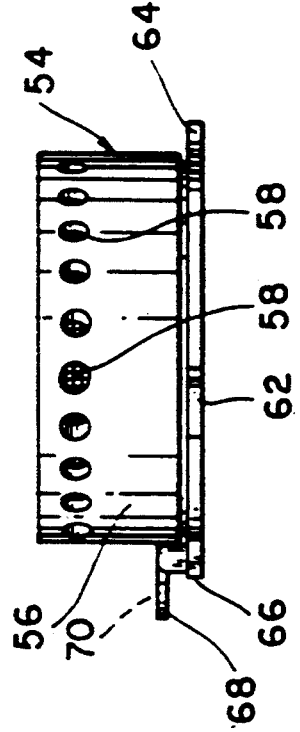
FIG. 5 shows a side view of the gas generator of FIGS. 3 and 4.
Figure 3:
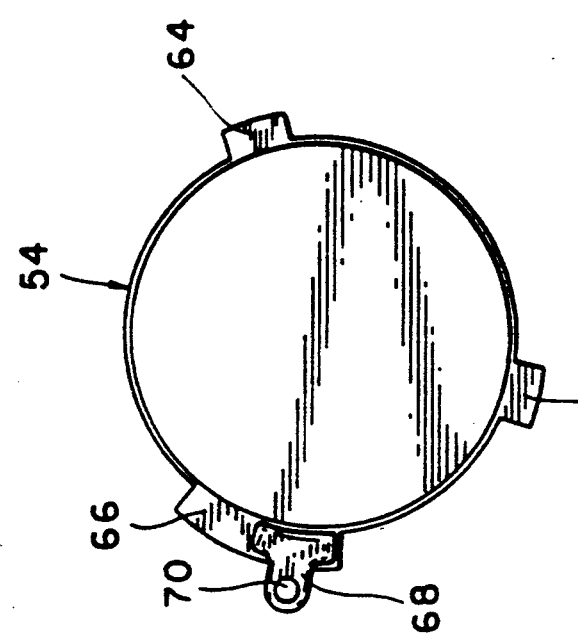
FIG. 3 shows a top view of the gas generator for the assembly.

Well 22 is also used to hold a gas generator 54 shown in detail in FIGS. 3–5. This gas generator may be constructed for example from aluminum and have the structure as described in copending application Ser. No. 715,493 identified above. Gas generator 54 includes a cylindrical body 56 with a plurality of holes 58. The body 56 has a bottom plate 60 with three arcuate tongues 62, 64 and 66 dimensioned to fit into notches 28, 30, and 32 of backing plate 26, respectively. Tongue 66 is provided with a lateral projection 68 having a round hole 70. Within gas generator 54 there is an acceleration sensor 72 with a a rotary member 74A having D-shaped hole 74. This sensor may be for example a mechanical sensor as described in U.S. patent application Ser. No.

715,493 identified above. When gas generator 54 is not installed, the rotary member 74A is positioned so that the sensor 72 is disarmed so that the generator is not set off even if it is accidentally dropped, hit with a hammer, and so on.

Figure 6:
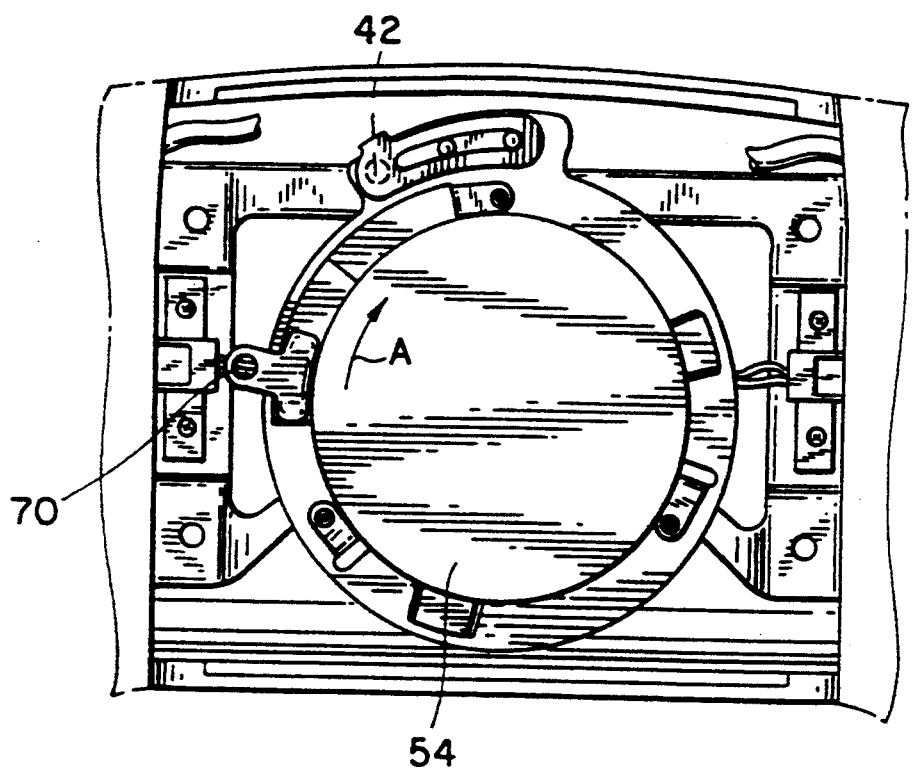
FIG. 6 shows the gas generator installed in the steering wheel well, with the sensor disarmed.
Figure 7:
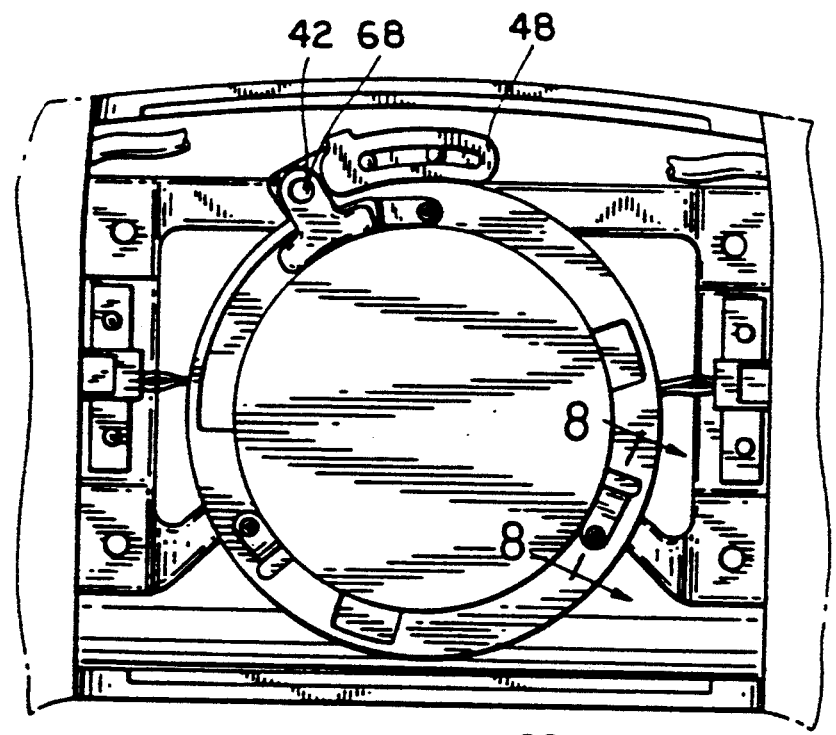
FIG. 7 shows the gas generator of FIG. 6 with the sensor armed.
Figure 8:
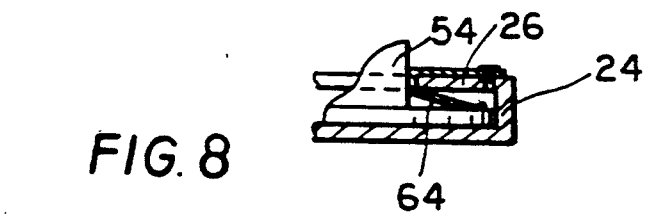
FIG. 8 is partial side-sectional view taken along line 8—8 in FIG. 7.

The gas generator 54 is installed into the wheel 10 as follows. First, the gas generator 54 is positioned in the 22 with shaft 53 inserted in hole 74 and tongues 62, 64, 66 inserted into notches 28, 30, 32 as shown in FIG. 6. The gas generator 54 is then rotated clockwise, as indicated by arrow A, causing the tongues 62, 64, 66 to slip under the lip 26 of plate 24. The gas generator 54 and plate 24 are dimensioned so that an interference fit is formed therebetween to maintain the gas generator 54 in place. Importantly, as gas generator 54 is rotated, shaft 53 remains fixed, thereby arming the sensor 72. In addition, as shown in FIG. 7, as the gas generator reaches the end of its travel, projection 68 pushes the slide plate 48 to the right, uncovering hole 42. Thus, when the gas generator 54 is in its secured and armed position shown in FIG. 7, hole 42 is uncovered since sliding plate 44 is pushed aside, and is aligned with hole 70.

Figure 9:
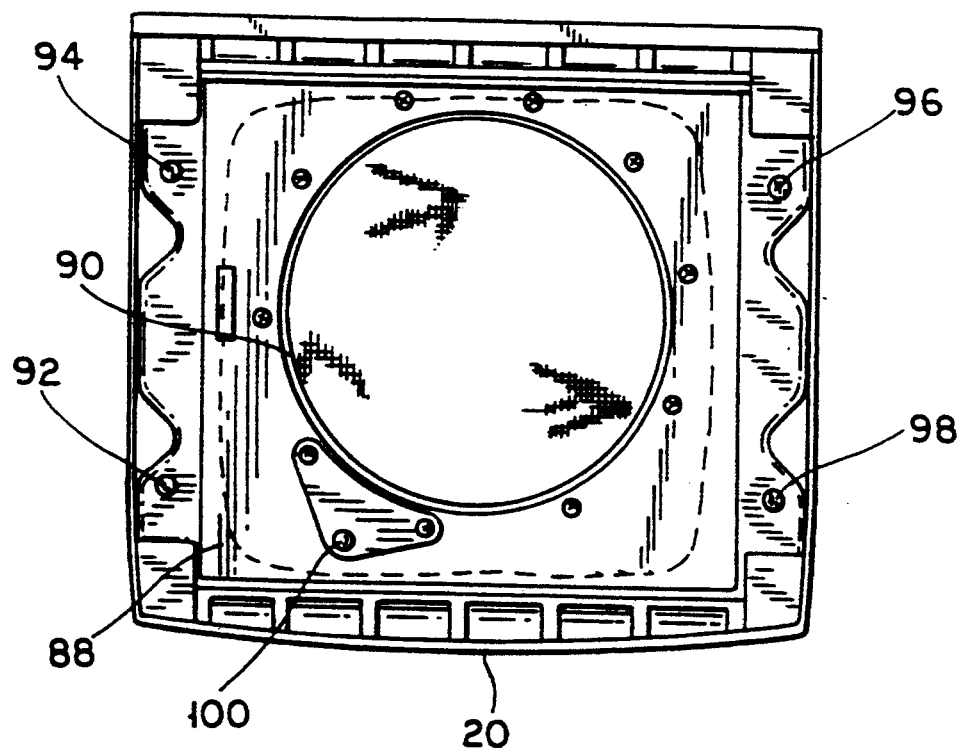
FIG. 9 shows a bottom view of the steering wheel cover with the air bag.

The cover 20, as shown in FIGS. 9 and 10, includes a top panel 80. This panel 80 is made of plastic or leather and has several parallel grooves 82, 84, 86 (shown in FIG. 1). On its bottom surface 88, cover 20 has a cylindrical wall 90. Inside cover 20, there is a folded air bag 91 (FIG. 10). The cover 20 also has five downwardly extending or protrusions studs 92, 94, 96, 98 and 100 which fit into holes 34, 36, 38, 40 and 42 respectively when the cover is installed over well 22. Studs 92, 94, 96 and 98 are preferably threaded. Once the cover 20 is installed over the well 22, its studs extend under the steering wheel so that it may be secured by nuts such as nut 102 (FIG. 10). Wall 90 is arranged to fit telescopically about gas generator 54.

Once the cover 20 is secured, the air bag assembly is armed and operational. If the motor vehicle is involved in a crash, the acceleration sensor 72 triggers the gas generator which emits an inflator gas through its holes 58. The cover 20 is arranged over the generator, so that this gas is channeled into the air bag 91. The air bag 91 then quickly expands breaking panel 80 along its parallel grooves.

The gas generator assembly described above has a number of very advantageous features. When disassembled, its gas generator is disarmed and therefore the components of the assembly are safe to handle. The cover 20, generator 54 and the backing plate 24 cooperate to prevent an improper or incomplete installation. More particularly, the cover 20 cannot be installed into well 22 without the gas generator being installed properly of the operation of the sliding plate 44. Plate 44 allows the proper installation and securing of cover 20 only after gas generator 54 is seated and armed within the well 22. Finally, if the air bag assembly has to be dismounted, the gas generator cannot be removed from the well before it is disarmed by rotating it counterclockwise with respect to shaft 53. If the gas generator 54 is not disarmed, it is prevented from being removed by backing plate 24.

In the above-described embodiment the air bag assembly is shown installed on a steering wheel; however, it may be installed on other parts of a motor vehicle, for example over a glove compartment. Obviously numerous other modifications may be made to the invention without departing from its scope as defined in the appended claims.

We claim:

1. An air bag system for mounting on a motor vehicle comprising:
    an air bag assembly including a gas generator having an armed and a disarmed state;
    housing means disposed in said motor vehicle for housing said gas generator, said housing means including mounting means for mounting said gas generator and securing said gas generator to said housing means, said mounting means cooperating with said gas generator for automatically arming said gas generator when said gas generator is secured to said housing means;
    cover means for closing said housing means; and
    cover prevention means for preventing said cover means from being installed on said housing means if said gas generator is in said disarmed state.

2. The air bag assembly of claim 1 with said mounting means further including arming means for arming said gas generator.

3. The air bag assembly of claim 2 wherein said arming means is arranged to disarm said gas generator when said air bag assembly is removed from said housing means.

4. The air bag assembly of claim 1 wherein said cover prevention means includes means for preventing said cover means from being installed on said housing means when said air bag assembly is missing from said housing means.

5. An air bag system for mounting on a motor vehicle comprising:
    an air bag assembly including a gas generator having an armed and a disarmed state;
    housing means disposed in said motor vehicle for housing said air bag assembly;
    mounting means for mounting said gas generator in said housing means, said gas generator having a first position with respect to said mounting means in which said gas generator is in said disarmed state and said gas generator is removable from said housing means, said gas generator being movable into a second position in which said gas generator and said mounting means are interengaged to retain said gas generator in said housing means, said gas generator and said mounting means cooperating to arm said gas generator automatically to said armed state when said gas generator is in said second position.

6. The air bag system of claim 5 further comprising a cover for closing said housing means.

7. The air bag system of claim 6 further comprising cover prevention means for preventing the installation of said cover over said housing means if said sensor is not armed by said arming means.

8. The air bag system of claim 7 wherein said air bag is disposed within said cover.

9. The air bag assembly of claim 8 wherein said air bag is formed with an opening with said gas generator being fit into said opening.

10. The air bag assembly of claim 5 further comprising an acceleration sensor disposed in said gas generator.

11. An air bag system for a motor vehicle with a passenger compartment, said system comprising:

an air bag assembly including a gas generator having an accelerator sensor, and an inflatable air bag disposed around said gas generator;

an open housing formed in said passenger compartment and shaped to receive said air bag assembly, and including mounting means for mounting said gas generator and securing said generator to said arming means for arming said sensor when said gas generator is inserted into said housing., said arming means cooperating with said mounting means for automatically arming said sensor when said gas generator is secured to said open housing; and cover means for covering said open housing.

12. The air bag system of claim 11 wherein said arming means includes a rotary member and a fixed member.

13. The air bag system of claim 12 wherein said rotary member is disposed in said sensor, and said fixed member is affixed to said housing and arranged to engage said rotary member.

14. The air bag system of claim 11 wherein said gas generator includes a shell and a tongue extending from said shell, and wherein said housing includes a plate for engaging said tongue for securing said gas generator in said housing.

15. The air bag system of claim 11 further including cover prevention means for preventing the installation of said cover when said gas generator is missing.

16. The air bag system of claim 11 further including cover prevention means for preventing the installation of said cover when said gas generator is not armed.

17. The air bag system of claim 16 wherein prevention means comprises a protrusion member and a hole for said protrusion member.

18. The air bag system of claim 17 wherein said protrusion member is disposed on said cover and said hole is formed on said housing.

19. The air bag system of claim 18 wherein said housing means includes a plate movable to selectively cover said hole.

20. The air bag system of claim 19 wherein said plate is movable by said gas generator.

21. The air bag system of claim 11 further including disarming means for disarming said air bag when said air bag is removed from said housing.

22. An air bag system for a motor vehicle with a passenger compartment, said system comprising:

an air bag assembly including a gas generator having an accelerator sensor, and an inflatable air bag disposed around said gas generator;

an open housing formed in said passenger compartment and shaped to receive said gas generator;

arming means for arming said sensor when said gas generator is inserted into said open housing, wherein said arming means includes a rotary member and a fixed member, said rotary member being disposed in said sensor, and said fixed member being affixed to said open housing and arranged to engage said rotary member to arm said sensor when said sensor is rotated with respect to said housing; and cover means for covering said open housing.

23. An air bag system for a motor vehicle with a passenger compartment, said system comprising:

an air bag assembly including a gas generator having an accelerator sensor, and an inflatable air bag disposed around said gas generator, said gas generator including a shell and a tongue extending from said shell;

an open housing formed in said passenger compartment and shaped to receive said gas generator, said open housing including a plate for engaging said tongue for securing said gas generator to said open housing;

arming means for arming said sensor when said gas generator is inserted into said open housing;

cover means for covering said open housing; and cover prevention means for preventing the installation of said cover when said gas generator is not armed, wherein said cover prevention means includes a protrusion member and a hole for said protrusion member.

24. The air bag system of claim 23 wherein said protrusion member is disposed on said cover and said hole is formed on said housing.

25. The air bag system of claim 24 wherein said housing includes a plate movable to selectively cover said hole.

26. The air bag of system of claim 25 wherein said plate is movable by said gas generator.

* * * * *